United States Patent [19]

Williams, Jr.

[11] Patent Number: 4,630,790
[45] Date of Patent: Dec. 23, 1986

[54] VELOCITY AND ATTITUDE CONTROL FOR EXOATMOSPHERIC PROJECTILE

[75] Inventor: Richard L. Williams, Jr., Corona Del Mar, Calif.

[73] Assignee: Ford Aerospace & Communications Corporation, Detroit, Mich.

[21] Appl. No.: 672,550

[22] Filed: Nov. 19, 1984

[51] Int. Cl.[4] .................................................. B64G 1/26
[52] U.S. Cl. ........................................ 244/169; 244/164
[58] Field of Search ............... 244/164, 169, 170, 321, 244/3.22, 158 R

[56] References Cited

U.S. PATENT DOCUMENTS

| | | | |
|---|---|---|---|
| 2,974,594 | 3/1961 | Boehm | 244/169 |
| 3,189,299 | 6/1965 | Garner et al. | 244/169 |
| 3,231,223 | 1/1966 | Upper | 244/169 |
| 3,363,856 | 1/1968 | Tossman et al. | 244/170 |
| 3,429,526 | 2/1969 | Genty | 244/169 |
| 3,612,442 | 10/1971 | Chisel | 244/169 |
| 3,643,897 | 2/1972 | Johnson, Jr. | 244/170 |
| 3,802,190 | 4/1974 | Kaufmann | 244/3.22 |
| 3,866,025 | 2/1975 | Cavanagh | 244/169 |
| 3,907,226 | 9/1975 | Neufeld et al. | 244/169 |
| 3,977,633 | 8/1976 | Keigler et al. | 244/169 |
| 4,288,051 | 9/1981 | Goschel | 244/169 |
| 4,407,469 | 10/1983 | Fox | 244/169 |

FOREIGN PATENT DOCUMENTS 90914 10/1983 European Pat. Off. ............ 244/164
1444982 5/1966 France ............................... 244/169

OTHER PUBLICATIONS

"Two Pulse Attitude Control of an Asymmetric Spinning Satellite," P. C. Wheeler, AIAA Guidance and Control Conference, MIT, Aug. 12-14, 1963.

Primary Examiner—Galen L. Barefoot
Assistant Examiner—Rodney Corl
Attorney, Agent, or Firm—Edward J. Radlo; Clifford L. Sadler

[57] ABSTRACT

A system for controlling the velocity and attitude of an exoatmospheric projectile (10) that spins about a spin axis (z). Several thrusters (e.g., 1-7) are disposed along the outer surface (8, 9, 11) of the projectile (10) for performing three prescribed functions. The number of thrusters (e.g., 1-7) is minimized to save weight. As few as four thrusters (1-4) can be used to perform the three prescribed functions, which are: (A) reorienting the spin axis (z) in inertial space, by firing the axial thrusters (1, 2, 6, 7); (B) adding velocity to the projectile (10) in any direction, without a concomitant change in the orientation of the spin axis (z), by firing continually a combination comprising at least one of the thrusters (1-7); and (C) changing the projectile's spin rate (W), by firing one of the radial thrusters (3, 4). Nutation dampers, such as ball-in-tube nutation dampers (20), can be used to decrease the cone angle E and thereby improve the pointing accuracy of the spin axis (z).

17 Claims, 14 Drawing Figures

JET 1-5 CONFIGURATION AND PROJECTILE 10 GEOMETRY

FIG. 1
JET 1-5 CONFIGURATION AND PROJECTILE 10 GEOMETRY

FIG. 2
JET 1-5 ON/OFF SEQUENCE FOR VARIOUS NET ΔV DIRECTIONS

FIG. 3 AXIAL AND RADIAL JET TURN-ON ANGLES VS ΔV DIRECTION

FIG. 4 THRUST EFFICIENCY FOR A ΔV MANEUVER

FIG. 5 MEAN THRUST EFFICIENCY FOR ΔV AVERAGED OVER A UNIT SPHERE

FIG. 6 COS (E) DURING VELOCITY ADDITION

FIG. 7 ANGULAR MOMENTUM VECTOR MOTION DURING ΔV ADDITION

FIG. 8 SPIN RATE W CHANGE DURING ΔV ADDITION

FIG. 9 SPIN AXIS $z$ MOTION DURING PRECESSION SLEW

FIG. 10 MAXIMUM CONE ANGLE $E_{max}$ DURING $\Delta V$ ADDITION

FIG. 11

BALL-IN-TUBE NUTATION DAMPERS 20

FIG. 12

FIG. 13 NUTATION DAMPING TIME CONSTANT K

FIG. 14
JET 1-7 CONFIGURATION AND PROJECTILE 10 GEOMETRY

VELOCITY AND ATTITUDE CONTROL FOR EXOATMOSPHERIC PROJECTILE

The U.S. Government has a paid up license in this invention and the right in limited circumstances to require the patent owner to license others on reasonable terms as provided for by the terms of contract No. F29601-85-C-0100 awarded by the United States Air Force.

DESCRIPTION

TECHNICAL FIELD

This invention pertains to the field of controlling the velocity and attitude of a spinning exoatmospheric projectile.

BACKGROUND ART

U.S. Pat. No. 3,231,223 is a flight attitude control system having six thrusters which can change a flying body's spin rate and change the orientation of its spin axis with respect to its pitch and yaw axes; however, the system is not capable of adding translational velocity along the pitch or yaw axes without changing the orientation of the spin axis; translational forces are in fact intentionally avoided, col. 1, lines 38-55. The patent refers to the prior art as teaching that twelve thrusters are required to perform the three functions that are performed by the present invention with as few as four thrusters; col. 1, lines 21-23. Addition of velocity in the patented system entails excessive torque, because the thruster axes do not pass through the center of mass of the flying body. Moving the thruster axes through the center of mass would cause other problems.

U.S. Pat. No. 3,907,226 shows a four thruster control scheme for spin stabilized devices. Although the patented scheme performs the present invention's functions of reorienting the spin axis and adding velocity along the negative spin axis, it does not perform the remaining functions of adding velocity in other directions or changing the spin rate. If these functions were performed, at least three additional thrusters would be required.

U.S. Pat. No. 4,288,051 discloses a method and apparatus for controlling a satellite about three orthogonal axes, not for controlling a spinning projectile. The patent shows fourteen jet nozzles 14.

U.S. Pat. No. 3,429,526 discloses an apparatus for tilting the orbital plane of a non-spinning space vehicle using five jets and a gravity boom pointing away from the earth.

Secondary references are: U.S. Pat. Nos. 2,974,594; 3,189,299; 3,612,442; 3,643,897; 3,802,190; 3,866,025; 3,977,633; and 4,407,469.

DISCLOSURE OF INVENTION

The instant inventive control system for spinning exoatmospheric projectile (10) employs several jet thrusters (e.g., 1-7). The number of jets, and thus the weight of projectile (10), is advantageously minimized. The system is capable of performing three prescribed functions: (1) aligning the projectile's spin axis (z) in inertial space as desired; (2) adding velocity to projectile (10) in any direction with high efficiency, with continual thrusting, and without changing the orientation of the spin axis (z); and (3) controlling the spin rate (W) of the projectile (10). Coning motion (wobble; nutation) is minimized when performing these maneuvers; the half-cone angle E (i.e., the angle in inertial space between the momentum vector and the tip of the spin axis (z); hereinafter referred to simply as "cone angle E") can be easily kept to less than 1 or 2 degrees.

Nutation dampers, such as ball-in-tube nutation dampers (20), can be used to reduce the cone angle E and thereby improve the pointing accuracy of the spin axis (z) to within a preselected deadband.

The three prescribed functions can be performed with as few as four jet thrusters (1-4), representing a welcome and considerable savings in weight compared with prior art approaches.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Preferably, the fuel used to power projectile 10 is solid, rather than liquid, propellant. This avoids fuel slosh problems and large shifts in center of mass 12. Once solid fuel is ignited, it's impractical to extinguish and later reignite it; therefore, one jet 1–7 is on at all times during the solid propellant fuel burn, permitting use of simple and conventional propulsion hardware (not illustrated). Dumping of fuel caused by the simultaneous activation of two opposing jets (e.g., 1 and 2) is avoided, in order to maintain high efficiency during velocity divert maneuvers. If one of the three prescribed functions is not needed at any particular time, jets 1 and 2 are alternated on.

Figure 1:
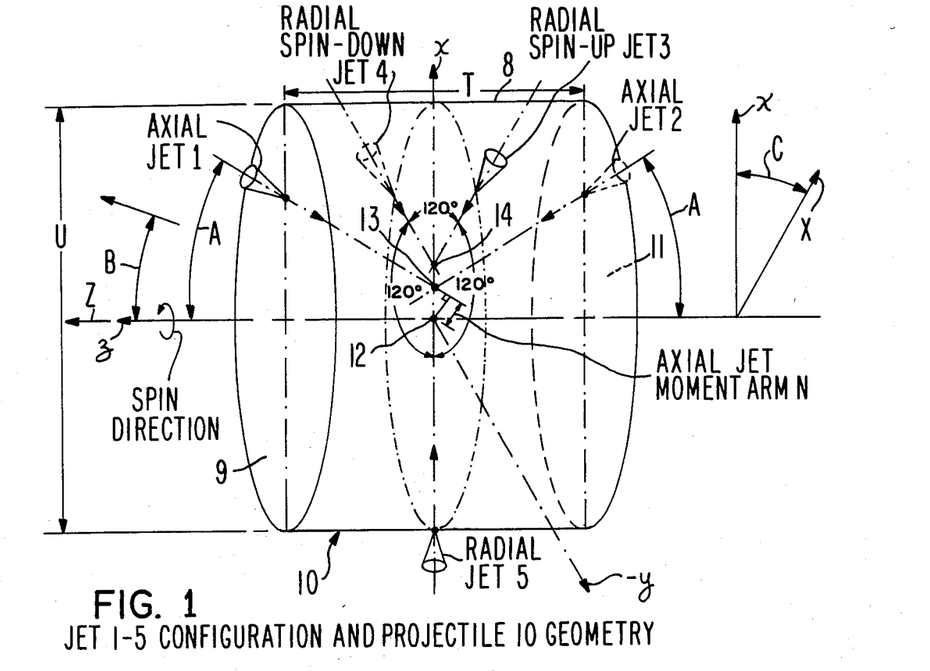
FIG. 1 is an isometric sketch of a first embodiment of the present invention, showing the orientation of the projectile (10) and its five control jets (1-5)

The first embodiment of the present invention, in which five jet thrusters (1–5) are preferably used, is shown in FIG. 1. X, Y and Z are a set of three orthogonal inertial (reference) axes. x, y and z are a set of three orthogonal axes fitted with respect to projectile 10, which spins at a rate W about its z axis.

Two axial jets 1, 2 are located on front and aft faces 9, 11, respectively, of projectile 10, and generate torques about the $+y$ and $-y$ transverse axes, respectively. Locating axial jets 1, 2 at or near the z axis can be difficult because of considerations of mechanical design, launch environment, and thermal design. On the other hand, offsetting the axial jets 1, 2 from the z axis can produce a large axial jet moment arm N about the y axis and a correspondingly large cone angle E. Therefore, axial jets 1, 2 are each shown as being offset from the z axis but tilted with respect to the z axis by an angle A, in order to reduce their moment arms N. The largest practical A is about 30 degrees, due to the decrease in thruster 1, 2 efficiency with increasing A (see infra). The force vectors associated with jets 1, 2 each pass through torque point 13 situated on the x axis and offset from the z axis. As used throughout this specification and claims, the "force vector" associated with a thruster 1–7 is that produced by that thruster 1–7 when the thruster 1–7 is fired. This force vector acts on the projectile 10 to change its attitude according to Newtonian principles, i.e., the force is equal in magnitude and opposite in direction to the thrust produced by the jet 1–7. The direction of each force vector is indicated on FIGS. 1 and 14 by means of an arrow.

Three radial jets 3, 4 and 5, are used in this embodiment, spaced along the cylindrical periphery 8 of projectile 10 equidistant from front face 9. Each radial jet 3–5 is also equidistant from aft face 11. The force vectors of jets 3–5 all pass through a point 14 that is offset from the z axis and lies on the x axis. Said radial jet force vectors form 120° angles with respect to each other. Radial jet 5 is aligned along the x axis and therefore its force vector passes through the center of mass 12 of projectile 10. Radial jets 3 and 4 have equal and opposite moment arms about the spin axis z, jet 3 giving a spin-up torque and jet 4 a spin-down torque. The thrusts imparted by jets 1–5 are preferably substantially equal, three pounds each in the illustrated embodiment.

For purposes of illustration only, the thickness T of projectile 10 is approximately 2.5 inches, the diameter U of projectile 10 is approximately 4 inches, and the weight of projectile 10 on earth is approximately 2.2 pounds. Projectile 10's moment of inertia about the spin (z) axis is 0.00057 slug-ft$^2$ for FIGS. 6–10 and 0.00082 slug-ft$^2$ for FIGS. 11–13. Projectile 10's inertia ratio (ratio of its spin to transverse moment of inertia) varies from about 1.4 to 1.2 as propellant is expended. (The transverse moment of inertia is the moment of inertia of projectile 10 about any axis in the x, y plane.) An inertial ratio of between 1 and 2 leads to dynamic stability, because coning motion is damped out by the inevitable energy dissipation. The shape of projectile 10 is such as to give dynamic stability at the illustrated nominal spin rate W of 20 Hz.

Projectile 10 may be guided from a location (not illustrated) external to projectile 10. Alternatively, projectile 10 carries its own onboard guidance system. In either case, the guidance means determines which thrusters 1–5 should be activated and when, based upon the desired maneuver.

The net $\Delta V$ (change in velocity) divert maneuver is represented in FIG. 1 as a vector acting at an angle B with respect to the spin axis z. This net $\Delta V$ vector is fixed inertially, say in the inertial X, Z plane. The projectile's x axis forms an angle C with respect to the inertial X axis. C changes as a function of time as projectile 10 spins.

Figure 2:
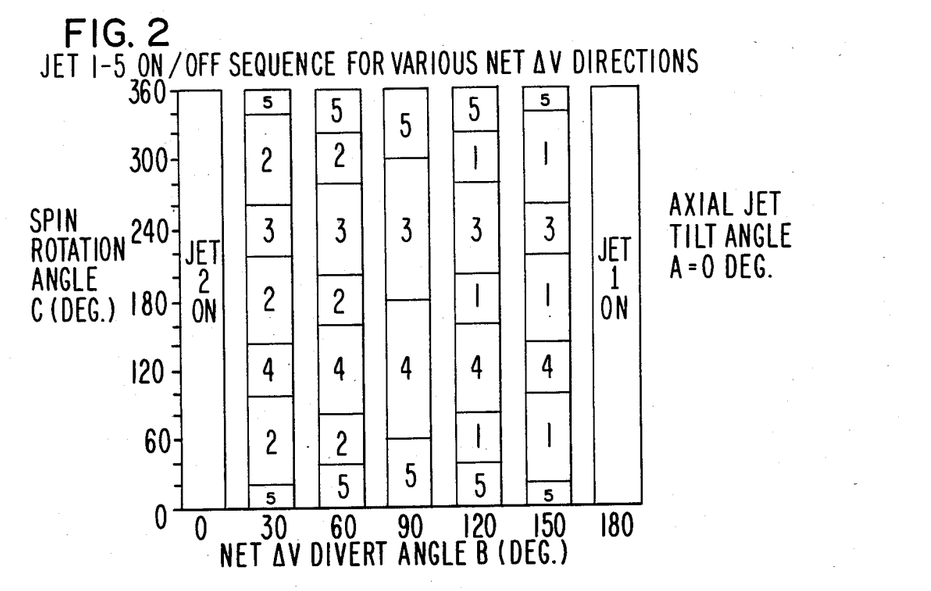
FIG. 2 is a chart showing, for the FIG. 1 embodiment, jet (1-5) on/off sequence for various net velocity addition divert angles B.

The required maneuver to add a net $\Delta V$ in an inertially fixed direction is to turn the radial and axial jets 1–5 on and off sequentially as the projectile 10 rotates, as illustrated in FIG. 2 for the addition of velocity at seven selected angles B, for 360 degrees of spin rotation angle C. FIG. 2 assumes that A=0. For B equals zero ($\Delta V$ along the positive spin axis z), axial jet 2 is turned on continuously. For B equals 180 degrees ($\Delta V$ along the negative spin axis $-z$), axial jet 1 is on continuously. For B equals 90 degrees ($\Delta V$ perpendicular to the spin axis z), the radial jets 3–5 are turned on sequentially for 120 degrees each; jet 5 is on first, then jet 4, followed by jet 3 and again jet 5. This on/off pattern repeats itself each revolution of projectile 10. While jet 4 is on, projectile 10 despins slightly; projectile 10 spins back up an equal amount while jet 3 is on. Jet 5 imparts no nominal spin torque.

Intermediate B angles, such as 30, 60, 120 and 150 degrees, require firing one axial jet 1, 2 in between firings of the three radial jets 3–5. For instance, at B equals 30 degrees, each radial jet 3–5 is on for about 45 degrees and axial jet 2 is turned on for 75 degrees in between firings of each two adjacent radial jets 3–5. The center of the radial jet 3–5 pulse occurs each 120 degrees of projectile 10 rotation, to keep the $\Delta V$ vector fixed inertially. This 120° is known as the "radial turn-on period".

Spin rate W control of projectile 10 is accomplished by turning on either radial jet 3 or 4. Jet 3 increases the spin rate W, while jet 4 despins projectile 10. The spin control jet 3, 4 normally is turned on for one or more complete spin revolutions so that no net translational velocity is added to projectile 10; only its angular velocity is corrected. The change is spin rate W over one revolution of radial jet 3–5 firing is minimal.

Alignment control of the direction of the projectile's spin axis z is achieved with the axial jets 1, 2. Axial jet 1 is turned on for 180 degrees of rotation, and then jet 2 is turned on for the next 180 degrees of rotation. This pattern is repeated for several revolutions as required. The direction of z-axis slew is determined by the starting time of the pulse sequence. This precession slew thrusting adds no net $\Delta V$, and results in only a small cone angle E (on the order of 1 degree, as shown later). The slew rate of the z-axis is about 30 degrees per second for a spin rate W of 20 Hz, a 0.00057 slug-ft$^2$ spin inertia, an axial jet moment arm N of 0.25 inches, and a three pound thrust from each jet 1, 2.

Figure 3:
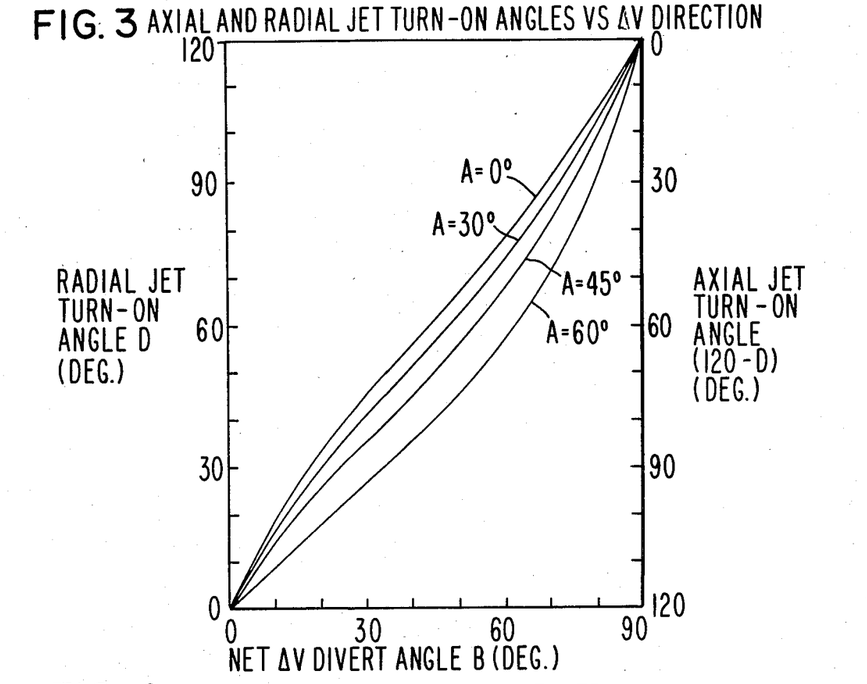
FIG. 3 is a graph showing radial and axial turn-on angles (D and 120-D, respectively) as a function of net velocity addition divert angles B, for the FIG. 1 embodiment.

The addition of velocity in direction B requires that the radial jets 3–5 each be turned on through some angle of rotation D. An axial jet (1 or 2) is then turned on through the remaining portion of the radial turn-on period. This sequence is repeated three times during each rotation of projectile 10. FIG. 3 gives the radial jet 3–5 turn-on angle D as a function of the desired net ΔV divert angle B, for various axial jet 1, 2 tilt angles A. For B from 90 to 180 degrees, the functional relationships of the jet turn-on angle D are mirror images of the plots in FIG. 3 (with B=180 degrees the same as B=0).

Figure 4:
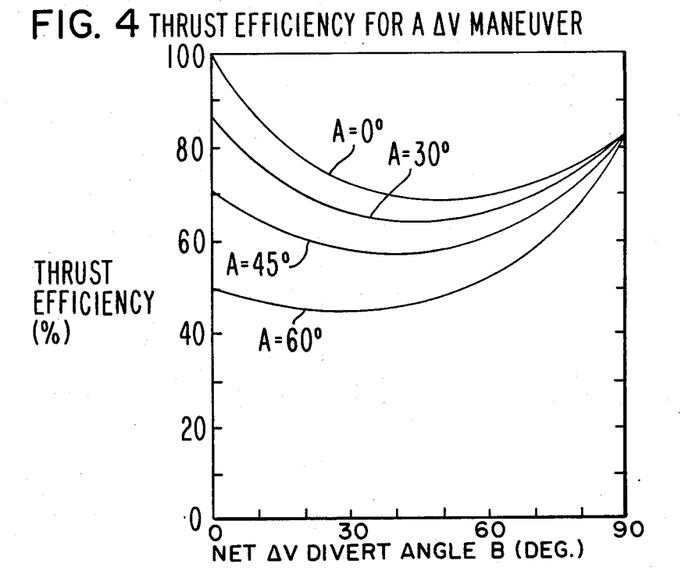
FIG. 4 is a graph showing overall system thrust efficiency for the FIG. 1 embodiment for a change in velocity maneuver.

A net ΔV maneuver in a specified direction has the major component of the vector from the appropriate jet 1–5 in the desired direction while a smaller component is wasted. The wasted components cancel each other out after one complete revolution of projectile 10. FIG. 4 shows the efficiency of this process as a function of net ΔV divert angle B. For B between 90 and 180 degrees, the thrust efficiency is a mirror image of the plots in FIG. 4. It is seen that the efficiency is 100 percent when adding velocity along the spin axis z (an axial jet 1, 2 on continuously) for A equals zero degrees (i.e., jets 1, 2 parallel to the spin axis z). For a tilt angle A of 30 degrees, at B=0 the efficiency drops to the cosine of 30 degrees (0.866). When velocity is added normal to the z axis (B=90 degrees), only the radial jets 3–5 are turned on, for D=120 degrees each, resulting in an efficiency of $(\sin(D/2))/(D/2)=83\%$.

The FIG. 4 plots describe an embodiment in which three radialjets 3–5 are employed. The addition of a fourth radial jet would increase the thrust efficiency, particularly in the vicinity of B equals 90 degrees (the efficiency would be 90 percent at B=90 degrees). However, there is a weight and complexity penalty associated with adding another radial nozzle and valve. Conversely, with only two radial jets, the efficiency would decrease to 64 percent at B=90 degrees.

The required velocity divert maneuver may be in any direction relative to the spin axis z. If it is assumed that the desired ΔV direction has an equal probability of being in any direction, the weighted average thrust efficiency can be computed. The curves in FIG. 4 are replotted in FIG. 5 with the ΔV angle B scale distorted to reflect the weighted average over all $4\pi$ steradian directions in a unit sphere. The weighted average efficiency is 74 percent for A=0. For A=30 degrees, the weighted average thrust efficiency decreases to 70 percent.

Figure 5:
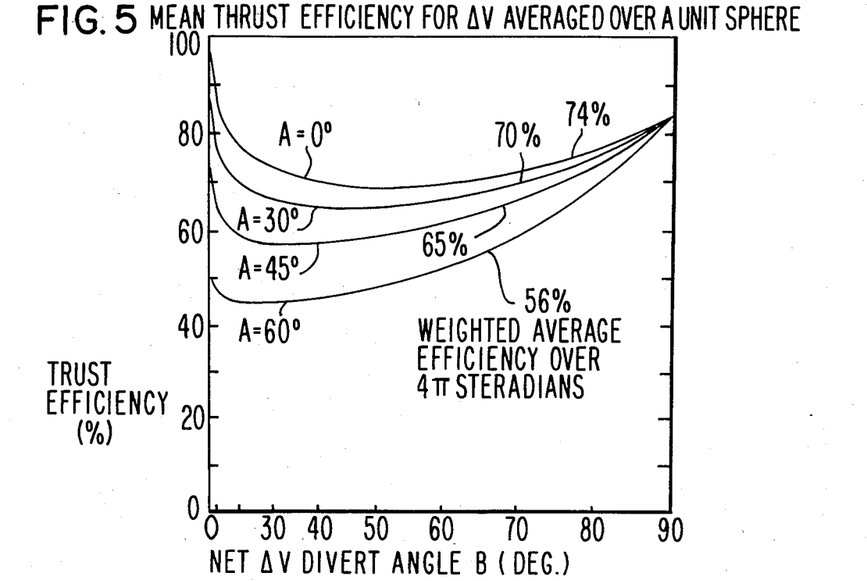
FIG. 5 is a graph showing mean thrust efficiency, averaged over a unit sphere, for the FIG. 1 embodiment for a change in velocity maneuver.

The efficiency computations depicted in FIGS. 4 and 5 assume square-wave jet pulses, and take into account geometrical factors only, not losses due to nozzle switching transients, specific impulse variation with temperature, etc.

A digital computer simulation program was written to evaluate the projectile 10 control system disclosed herein, and to aid in trade-off studies of the relevant parameters. The results of the simulation show that the spinning projectile 10 is dynamically stable for all maneuvers, that is, the various jet 1–5 pulsing schemes do not generate 3-axis coning motion which grows with time, nor unwanted precessional slewing, nor unwanted velocity addition, nor unwanted changes in spin rate W. With axial jet moment arms N reduced to about 0.25 inches, cone angle E is limited to within 1 or 2 degrees in the absense of a nutation damping system on board the projectile 10. Even though not required for reasons of dynamic stability, such a nutation damping sysstem can be used to improve z-axis pointing accuracy by decreasing the cone angle E.

Figure 6:
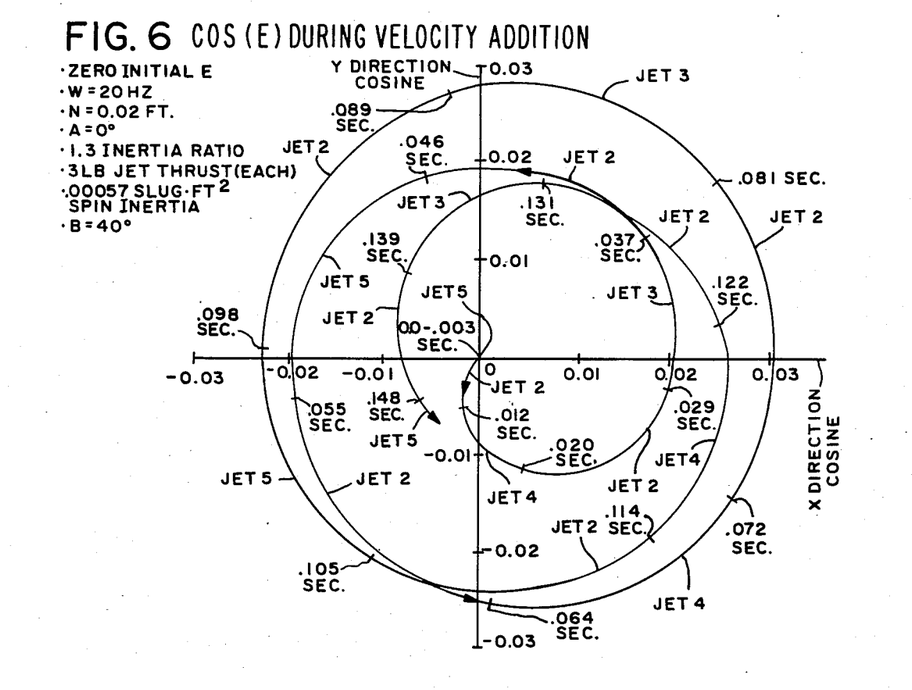
FIG. 6 is a chart showing motion of the spin axis (z) in inertial space during a change in velocity maneuver for the FIG. 1 embodiment.

The computer simulation result for a typical velocity addition at an angle B of 40 degrees is shown in FIG. 6, a plot of the tip of the spin axis z projected onto a unit sphere surrounding projectile 10. The orthogonal coordinates in FIG. 6 are the direction cosines of the z-axis relative to the inertial X and Y axes. The inertial Z axis and the initial location of the tip of the z-axis are aligned at the center of the FIG. 6 plot at time t=0. No nutation damping was assumed for the FIG. 6 configuration.

To understand FIG. 6, let us proceed in time and follow the motion of the tip of the z-axis as the jets 1–5 pulse, and a net ΔV is added at B=40 degrees in the inertial X, Z plane. At time zero, the spin axis z is at the origin and there is no initial coning motion. The spin rate W is 20 Hz, so that a complete revolution of projectile 10 occurs each 0.050 seconds. Radial jet 5 turns on from time 0 to 0.003 seconds to add ΔV, and the z-axis stays at the origin in pure spin. The axial jet 2 turns on from time 0.003 to 0.012 seconds, as a torque is applied about the projectile's y axis and ΔV is added. This transverse torque (perpendicular to the z-axis) moves the net angular momentum vector of projectile 10, and causes the z-axis to cone (nutate) about the instantaneous angular momentum vector. From time 0.012 to 0.020 seconds, radial jet 4 is on, and the z-axis continues to cone about the stationary angular momentum vector. From time 0.020 to 0.029 seconds, axial jet 2 is on again, and the cone angle E increases somewhat as the angular momentum vector is slewed again by the transverse torque. The z-axis cones faster than it spins, since the projectile's inertia ratio of 1.3 is greater than unity. The pulsing scheme continues as radial jet 3 turns on from 0.029 to 0.037 seconds, then axial jet 2 is on until 0.046 seconds, whereupon radial jet 5 comes on again to complete the first revolution at 0.050 seconds. The cone angle E is now about 1 degree (0.0175 radians), the same magnitude as a direction cosine of 0.0175 in FIG. 6.

FIG. 6 shows that the control scheme is dynamically stable when adding ΔV, since the coning motion of the Z-axis stops increasing after about two revolutions of projectile 10, and decreases during the third revolution. The plot ends at 0.150 seconds (three revolutions), but many long simulation runs confirm that the cone angle E does not grow, but rather varies between a fraction of a degree and 1.5 degrees for this set of conditions. Smaller or larger maximum cone angles E result, depending upon the cone angle E when the ΔV divert maneuver is initiated. For large initial cone angles E, the coning motion shrinks every few revolutions and returns to its large initial value periodically, never exceeding its initial value.

Figure 7:
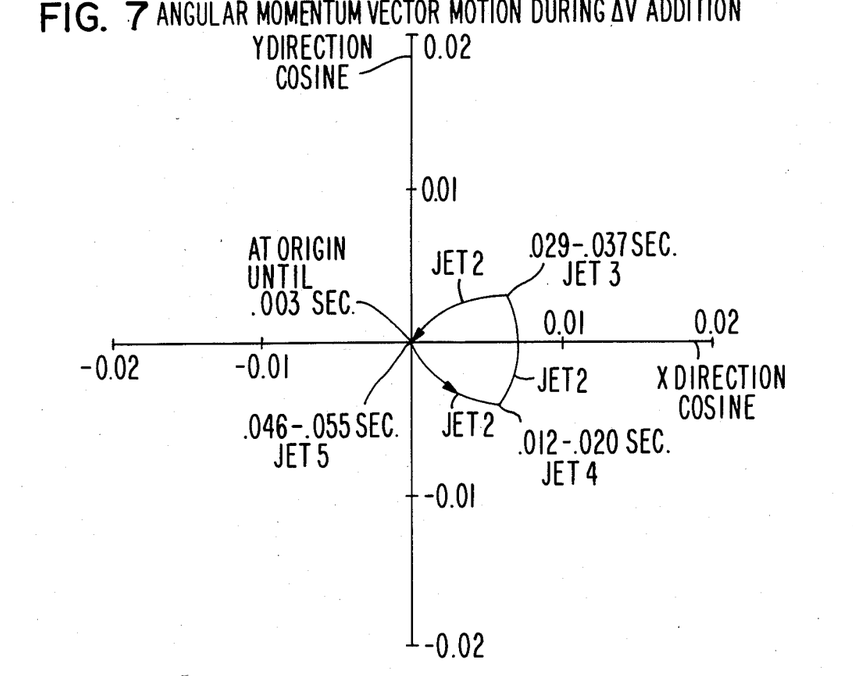
FIG. 7 is a graph showing motion of the angular momentum vector of projectile (10) during a change in velocity maneuver for the conditions of FIG. 6.

One of the reasons for this dynamic stability is the motion of the projectile's angular momentum vector during a ΔV divert maneuver. FIG. 7 is a plot of the direction cosines of the tip of the angular momentum vector during the first projectile 10 revolution for the case shown in FIG. 6. FIGS. 6 and 7 have the same scale and time base and could be overlaid if desired. It is seen in FIG. 7 that the angular momentum vector is slewed in a triangular pattern by each of the three pulses of axial jet 2. During the three radial jet 3–5 pulses, the angular momentum vector does not move, since no transverse torques are present. During each spin revolution, the angular momentum vector is slewed approximately around this same triangle.

Spinning bodies with inertia ratios greater than unity always have a coning rate which is greater than their spin rate. Therefore, sometimes the angular momentum vector is slewed away from the z-axis and the cone angle E increases, and later the angular momentum vector is slewed toward the z-axis and the cone angle E decreases. This causes periodic increases and decreases in the cone angle E but no long term growth or long term shrinkage. Dynamic stability results for all initial conditions, all velocity divert angles B, and all combinations of parameters. The addition of nutation dampers reduces the cone angle E, but nutation dampers are not required for stability.

Figure 8:
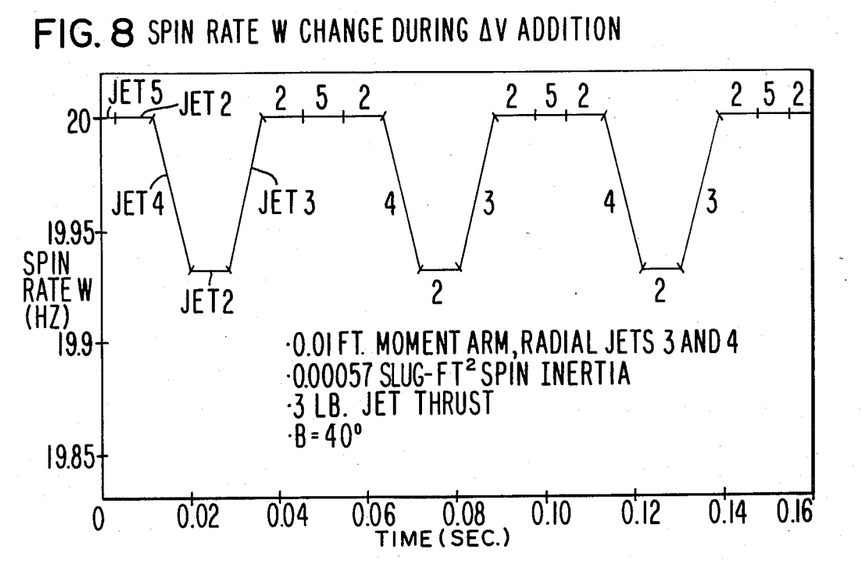
FIG. 8 is a graph showing the change in projectile (10)'s spin rate (W) during a change in velocity maneuver for the conditions of FIG. 6.

The spin rate W changes somewhat during a ΔV addition, because radial jets 3 and 4 have spin-up and spin-down torques, respectively. FIG. 8 shows the spin rate W for the same ΔV divert maneuver given in FIGS. 6 and 7. It is seen that spin rate W is decreased from its nominal 20 Hz down to 19.933 Hz by jet 4, and is increased again to its nominal value by jet 3. Since the two jets 4, 3 are on for equal times, there is no long term variation in spin rate W. This spin rate W variation affects the direction of the net ΔV vector, but the error is insignificant compared to other error sources. The maximum change in spin rate W occurs when ΔV is added at an angle B of 90 degrees and each radial jet 3–5 is on for 120 degrees; even here, with the parameters used in FIGS. 6–8, the spin rate W decreases to only 19.87 Hz before returning to its nominal 20 Hz.

The control scheme for realigning the projectile's spin axis z through a large angle is to turn one axial jet 1, 2 on for 180 degrees of spin rotation, and then to turn on the other axial jet 2, 1 for the subsequent 180 degrees of rotation. The direction of the precession slew maneuver is determined by the rotation angle C at the center of the jet 1, 2 pulses. This sequence of 180 degree axial jet 1, 2 pulses is repeated as necessary until the spin axis z is slewed to its desired pointing direction (within the tolerance of some alignment deadband on the order of 1 degree).

Figure 9:
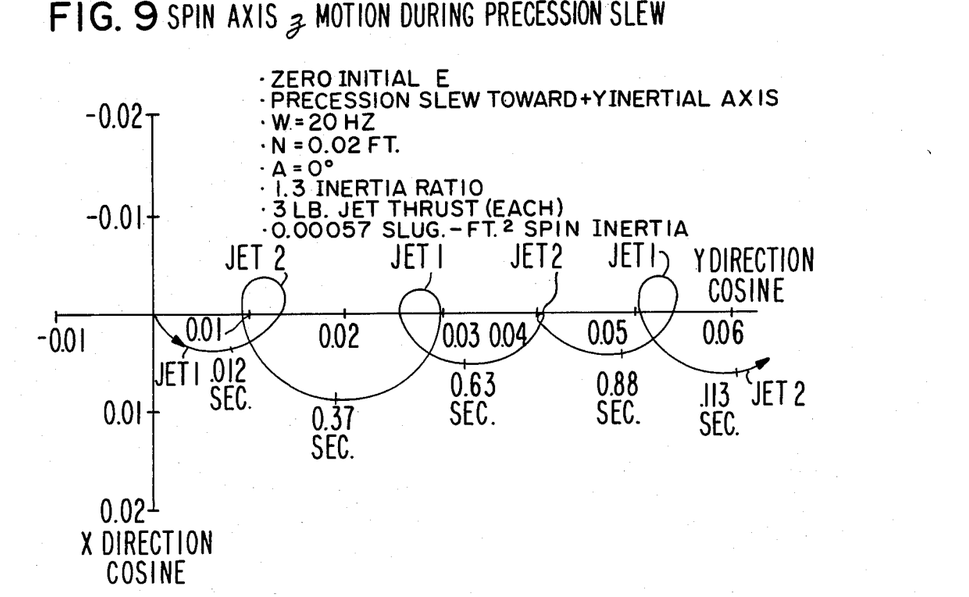
FIG. 9 is a graph showing the motion of the tip of projectile (10)'s spin axis (z) in inertial space during a precession slew for the FIG. 1 embodiment.

FIG. 9 shows the motion of the tip of the z-axis during a precession slew. The parameters are the same as previously, and the direction cosines are plotted as in FIGS. 6 and 7, with the ordinates reversed. The motion shown is the first 4 degrees of a 90 degree slew maneuver that eventually aligns the z-axis with the inertial Y axis after starting at the inertial Z axis. FIG. 9 shows that a cone angle E no larger than about 1 degree (0.0175 radians) occurs periodically between the closed loops; during these loops, the cone angle E is reduced to about 0.1 degree; the slew maneuver is dynamically stable even without any nutation damping. An attempt to slew the z-axis into some pointing direction deadband may impose a damping requirement, depending upon the alignment sensor (not illustrated). Larger axial jet 1, 2 torques and/or larger initial cone angles E cause larger cone angles E during the slew maneuver than shown in FIG. 9. However, there still is no long term growth in the coning motion, which indicates that the control scheme is dynamically stable. No net velocity is added during the slew maneuver to a first order approximation, since equal and opposite axial jet 1, 2 pulses cancel after each complete revolution of projectile 10.

Figure 10:
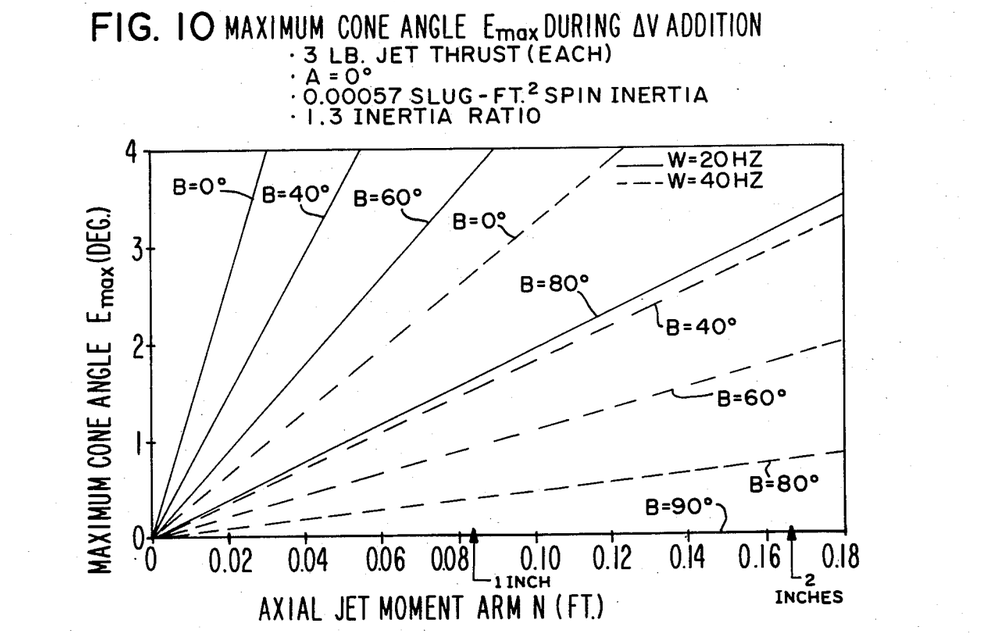
FIG. 10 is a graph showing the maximum cone angle (Emax) of the spin axis (z) during a change in velocity maneuver for the conditions of FIG. 6.

The computer simulation program was run extensively with various parameters to determine the maximum cone angle Emax during ΔV velocity divert maneuvers. It was determined that the worst case initial condition was no coning motion. It was found that a small initial cone angle E usually gave a smaller maximum cone angle Emax over time than an initial condition of no coning motion. Large initial coning is not likely with some damping onboard projectile 10. Also, large initial coning persists with time, as mentioned earlier. No nutation damping was included in the analysis. FIG. 10 gives the results. The maximum cone angle Emax is plotted versus the axial jet moment arm N for 20 and 40 Hz spin rates W and as a function of the net ΔV divert angle B. It is seen that the maximum cone angle Emax is proportional to the axial jet moment arm N (for a constant thrust from each jet 1–5), and inversely proportional to the square of the spin rate W. Also, the largest maximum cone angle Emax occurs for a B of zero, since one axial jet 1, 2 is turned on continuously. Progressively smaller maximum cone angles Emax occur as B increases toward 90 degrees, since the axial jet 1, 2 on-times are decreasing toward zero. These results are expected from theoretical considerations.

Figure 11:
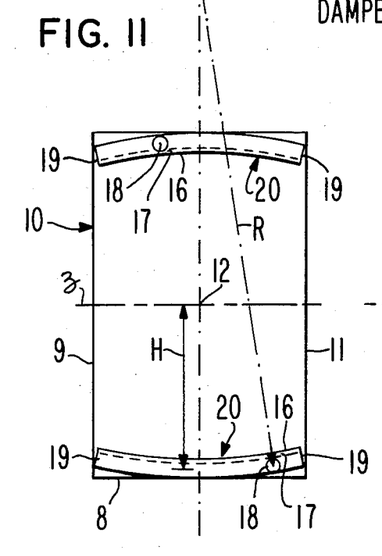
FIG. 11 is a side view of a projectile (10) for which the present invention may be used, showing nutation dampers (20)
Figure 12:
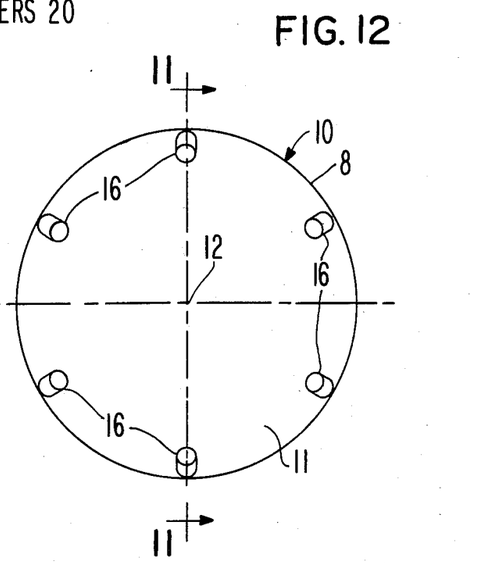
FIG. 12 is an end view of the projectile (10) depicted in FIG. 11.

FIGS. 11 and 12 show an optional feature which can be used with all embodiments of the present invention: several (in the illustrated case, six) substantially identical ball-in-tube nutation dampers 20 mounted equally-spaced circumferentially just within the cylindrical periphery 8 of projectile 10. Each ball 18 is a one-eighth inch outer diameter tungsten carbide ball bearing weighing 0.000555 pounds (0.25 grams). Each tube 16 has an optimum radius of curvature R of 1.1 feet, and the length of each tube 16 is as long as possible (2.5 inches for the FIG. 1 embodiment). The gap 17 between the tube 16 inner diameter and the ball 18 outer diameter is about 0.003 inches. This gives the desired viscous damping when the tube 16 is filled with nitrogen at one atmosphere. About ten percent helium is added to the nitrogen so that the end plates 19 on the tube 16 can be easily checked for leakage.

Figure 13:
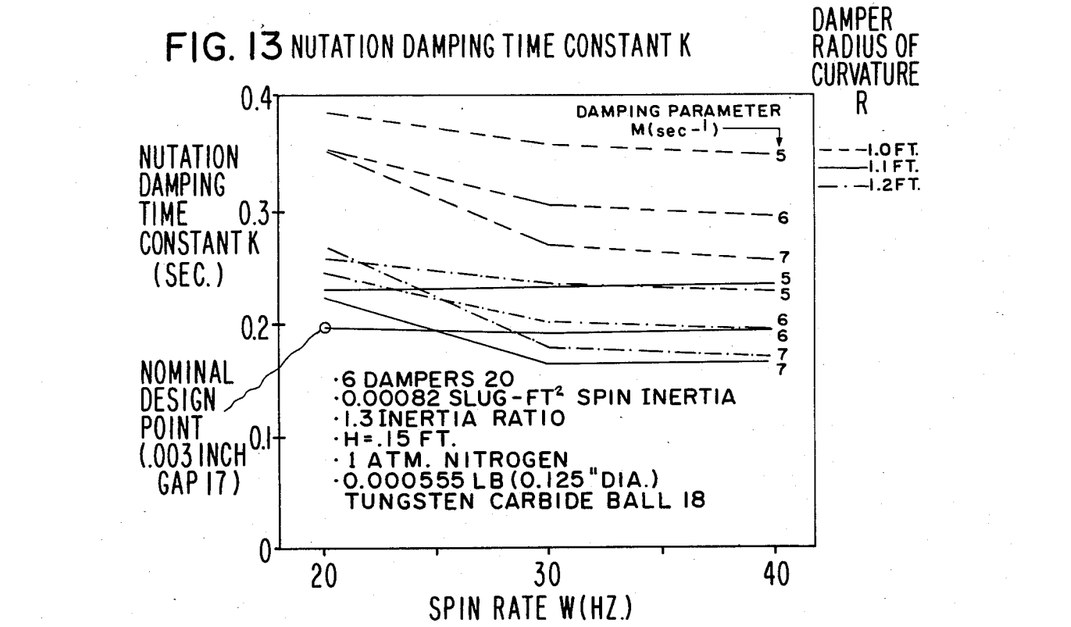
FIG. 13 is a graph showing the nutation damping time constant (K) as a function of spin rate (W) for the projectile (10) depicted in FIGS. 11 and 12.

The nutation damping time constant K for six ball-in-tube dampers 20 is plotted in FIG. 13. Damping time constant K is defined as the time it takes to reduce the cone angle E to one over e (1/2.718) of its current value when no torques are applied to projectile 10. The nine time constant curves represent ±10 percent tolerances on the nominal radius of curvature R (1.1 feet) and ±15 percent tolerances on the nominal damping parameter M (6/sec). The damping parameter M determines the gap 17 size for a given viscous fluid or gas. The damping time constant K is shown for spin rates W up to 40 Hz, since a higher spin rate W is one method of reducing the effect of high torques by the axial jets 1, 2.

It is seen in FIG. 13 that the nominal design point gives a time constant K of 0.2 seconds. Within the reasonable tolerances plotted, the largest time constant K is 0.4 seconds. The damping requirement is influenced by the z-axis pointing accuracy requirement and the measurement technique used by the attitude sensors (not illustrated) on board projectile 10. The basic ΔV addition and precession slewing control schemes have no damping requirement. Three ball-in-tube dampers 20 may well be adequate for many applications. In this case, time constant K would be twice that for the six damper case. More damping can be achieved by using heavier balls 18; twice as heavy balls 18 (26 percent greater diameter) would give one half the time constant K shown in FIG. 13.

Another factor to consider with ball-in-tube nutation dampers 20 is the effect when the balls 18 hit the ends 19 of the tubes 16. With the illustrated parameters, the angular travel of each ball 18 along its corresponding tube 16 is about five times the magnitude of the cone angle E. The length of the damper tubes 16 (2.5 inches) allows an angular travel of the balls 18 of ±5.4 degrees. Therefore, the balls 18 hit an end 19 whenever the cone angle E exceeds 1.1 degrees. There is a graceful degradation in the damping time constant K when the balls 18 start bouncing off the ends 19. The degradation is a doubling or tripling of the damping time constant K for twice the bounce-inducing cone angle E (2.2 degrees). This damping degradation is another reason the cone angle E should be kept low.

Figure 14:
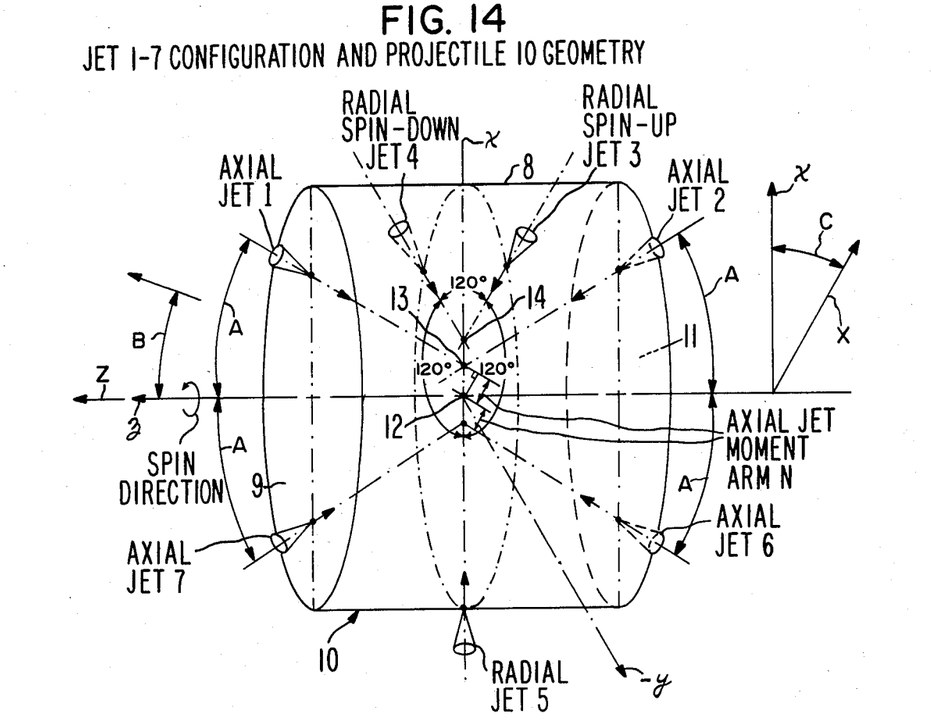
FIG. 14 is an isometric sketch of a second embodiment of the present invention, in which seven jet thrusters (1-7) are used.

FIG. 14 shows a second embodiment of the present invention is which there are four axial jets 1, 2, 6, 7 in addition to three radial jets 3–5. In this embodiment, the axial jets 1, 2, 6, 7 always thrust in pairs. Two axial jets 1, 7 are mounted on the front face 9 of projectile 10, and two axial jets 2, 6 are mounted on the aft face 11. Although the thruster 1–7 valves and nozzles are light, there is a small weight penalty. Each valve works independently.

In this second embodiment, two axial jets (2 and 6, or 1 and 7) fire during a ΔV maneuver, and have a nominal net moment arm N of zero. Each jet 1, 2, 6, 7 has half the thrust as jets 1 and 2 in the FIG. 1 embodiment, so the total thrust during each firing is the same.

For a z-axis precession slew, the simplest approach would be to fire two opposing axial jets, either 2 and 7, or 1 and 6 (a pure couple), together for 180 degrees of rotation, followed by firing the other pair (1 and 6, or 2 and 7) for the subsequent 180 degrees. However, this would cause a very large maximum cone angle Emax of about 5 degrees. Therefore, it is preferable to turn on a pair of axial jets (2 and 7, or 1 and 6) in a pure couple for only 30 degrees of spin rotation, and 180 degrees later turn on the other pair of axial jets (1 and 6, or 2 and 7) in a pure couple for 30 degrees. This reduces the maximum cone angle Emax during precession slew by a factor of about six, down to 0.8 degrees, with a slew rate of 30 deg/sec. During the remaining portion of each revolution, two equal and opposite axial jets (1 and 2, or 6 and 7) are fired to give zero net thrust, i.e., fuel is dumped. This is not really a waste of fuel compared to the FIG. 1 embodiment, since the latter is inefficient during a precession slew maneuver due to the small torques imparted for the illustrated small moment arms N. Measured in slew rate, the FIG. 1 and FIG. 14 embodiments are equally efficient.

When a precession slew maneuver is occuring for the FIG. 14 embodiment, spin rate W can be corrected when the axial jets 1, 2, 6, 7 are not thrusting in a pure couple and fuel is being dumped. This is an advantage over the FIG. 1 embodiment.

In either the FIG. 1 or FIG. 14 embodiment, radial jet 5 could be eliminated to save more weight, with some loss in efficiency, and the three prescribed functions of the present invention can still be performed. In this case, the force vectors from jets 3 and 4 still pass through a common torque point 14 offset from the z-axis, but these force vectors form an angle of 180° rather than 120°. For this alternative, the radial turn-on period is 180° rather than 120°.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A system for controlling the velocity and attitude of an exoatmospheric projectile spinning about a spin axis and having a generally cylindrical outer shape consisting of a generally cylindrical periphery whose long axis is the spin axis, and front and aft generally circular faces located at opposing ends of the generally cylindrical periphery, said system comprising:
    a first axial thruster positioned on the front face and having a force vector pointing inwardly through the projectile;
    a second axial thruster positioned on the aft face and having a force vector pointing inwardly through the projectile; and
    first and second radial thrusters, positioned on the generally cylindrical periphery and each having a force vector pointing inwardly through the projectile and intersecting at a common point that is offset from the spin axis; wherein
    the spin axis can be reoriented in inertial space by firing the axial thrusters;
    velocity can be added to the projectile in any direction, without a concomitant change in orientation of the spin axis, by firing a combination comprising at least one of the thrusters; and
    the spin rate of the projectile can be changed by firing one of the radial thrusters.

2. The system of claim 1 further comprising a third radial thruster having a force vector passing through the projectile's center of mass and intersecting said common point; wherein
    each of the three radial thrusters is located along the generally cylindrical periphery a common distance from the front face; and
    the three radial thrusters' force vectors form angles of 120° with respect to each other.

3. The system of claim 1 wherein the force vector associated with each axial thruster is tilted a like angle with respect to the spin axis and passes through a common axial torque point offset from the spin axis.

4. The system of claim 1 further comprising several ball-in-tube nutation dampers positioned equally-spaced circumferentially just within the generally cylindrical periphery.

5. The system of claim 1 wherein each thruster imparts a like amount of thrust.

6. The system of claim 1 wherein the axial thrusters are equidistant from the spin axis.

7. A system for controlling the velocity and attitude of an exoatmospheric projectile spinning about a spin axis and having a generally cylindrical outer shape consisting of a generally cylindrical periphery whose long axis is the spin axis, and front and aft generally circular faces located at opposing ends of the generally cylindrical periphery, said system comprising:
    first and second axial thrusters located on the front face, equidistant from the spin axis, and each having a force vector pointing inwardly through the projectile;
    third and fourth axial thrusters located on the aft face, equidistant from the spin axis, and each having a force vector pointing inwardly through the projectile; and
    first and second radial thrusters positioned on the generally cylindrical periphery and each having a force vector pointing inwardly through the projectile and intersecting at a common point that is offset from the spin axis; wherein
    the spin axis can be reoriented in inertial space by firing the axial thrusters;
    velocity can be added to the projectile in any direction, without a concomitant change in orientation of the spin axis, by firing a combination comprising at least one of the thrusters; and the spin rate of the projectile can be changed by firing one of the radial thrusters.

8. The system of claim 7 further comprising a third radial thruster having a force vector passing through the projectile's center of mass and intersecting said common point; wherein
 each of the three radial thrusters is located along the generally cylindrical periphery a common distance from the front face; and
 the three radial thrusters' force vectors form angles of 120° with respect to each other.

9. The system of claim 7 wherein the force vector associated with each axial thruster is tilted a like angle with respect to the spin axis;
 the force vectors associated with each of the first and third axial thrusters pass through a first axial torque point offset from the spin axis; and
 the force vectors associated with each of the second and fourth axial thrusters pass through a second axial torque point offset from the spin axis.

10. The system of claim 7 further comprising several ball-in-tube nutation dampers positioned equally-spaced circumferentially just within the generally cylindrical periphery.

11. The system of claim 7 wherein each radial thruster imparts a like amount of thrust, and each axial thruster imparts an amount of thrust equal to one half the amount of thrust imparted by each radial thruster.

12. The system of claim 7 wherein all four axial thrusters are equidistant from the spin axis.

13. A method for controlling the velocity and attitude of an exoatmospheric projectile spinning about a spin axis and having a generally cylindrical outer shape consisting of a generally cylindrical periphery whose long axis is the spin axis, and front and aft generally circular faces located at opposing ends of the generally cylindrical periphery, said method comprising:
 mounting at least one axial thruster on the front face and at least one axial thruster on the aft face, wherein each axial thruster has a force vector pointing inwardly through the projectile;
 mounting at least first and second radial thrusters on the generally cylindrical periphery, wherein each radial thruster has a force vector pointing inwardly through the projectile and intersecting at a common point that is offset from the spin axis; and
 performing the following additional steps:
 reorienting the spin axis in inertial space by firing the axial thrusters;
 adding velocity to the projectile in any preselected direction, without a concomitant change in orientation of the spin axis, by firing a combination comprising at least one of the thrusters; and
 changing the spin rate of the projectile by firing one of the radial thrusters.

14. The method of claim 13 wherein the force vector associated with each axial thruster is tilted a like angle with respect to the spin axis and passes through an axial torque point offset from the spin axis.

15. The method of claim 13 further comprising the step of positioning several ball-in-tube nutation dampers equally-spaced circumferentially just within the generally cylindrical periphery.

16. The method of claim 13 wherein a like amount of thrust is imparted to the projectile each time a thruster firing step is performed.

17. The method of claim 13 wherein the axial thrusters are equidistant from the spin axis.

* * * * *